US012529261B2

(12) United States Patent
Jackson et al.

(10) Patent No.: US 12,529,261 B2
(45) Date of Patent: Jan. 20, 2026

(54) ONE-PIECE SCREENING SYSTEM

(71) Applicant: ILPEA Industries Inc., Scottsburg, IN (US)

(72) Inventors: Michael Jackson, Nabb, IN (US); Riccardo Gabaldo, New Albany, IN (US)

(73) Assignee: ILPEA Industries Inc., Scottsburg, IN (US)

( * ) Notice: Subject to any disclaimer, the term of this patent is extended or adjusted under 35 U.S.C. 154(b) by 221 days.

(21) Appl. No.: 17/875,635

(22) Filed: Jul. 28, 2022

(65) Prior Publication Data

US 2024/0035336 A1 Feb. 1, 2024

(51) Int. Cl.
*E06B 9/52* (2006.01)

(52) U.S. Cl.
CPC .......... *E06B 9/52* (2013.01); *E06B 2009/527* (2013.01)

(58) Field of Classification Search
CPC .. E06B 9/52; E06B 2009/527; G09F 15/0025; B44D 3/185
USPC ........ 160/380, 383, 394, 395, 397, 399, 402
See application file for complete search history.

(56) References Cited

U.S. PATENT DOCUMENTS 1,178,219 A 4/1916 Cramer
2,709,489 A * 5/1955 Keebler .................... E06B 9/52 160/381
3,220,469 A * 11/1965 Oehmig .................... E06B 9/52 160/395
3,379,237 A 4/1968 Miller
3,552,476 A 1/1971 Le Tarte
3,729,045 A 4/1973 MacDonald
4,986,332 A * 1/1991 Lanuza .................. E06B 9/521 428/904.4
5,904,200 A 5/1999 Agen
(Continued)

FOREIGN PATENT DOCUMENTS

KR 20150054150 A 5/2015
WO WO-2011062492 A1 5/2011
WO WO-2014036591 A1 3/2014

OTHER PUBLICATIONS

International Search Report and Written Opinion of the International Searching Authority regarding International Patent Application No. PCT/US2023/028812, dated Nov. 15, 2023.
(Continued)

*Primary Examiner* — Abe Massad
*Assistant Examiner* — Matthew R. Shepherd
(74) *Attorney, Agent, or Firm* — Harness, Dickey & Pierce, P.L.C.

(57) ABSTRACT

A screen attachment assembly is provided and includes a cover extending between a first cover end and a second cover end, a base extending between a first base end and a second base end, and a spline. The cover includes a lip extending from a cover body at the second cover end and an arm extending from the cover body. The base includes a first leg and a second leg extending from a base body in the same direction. The spline is disposed between the first and second legs. The first cover end of the cover is pivotally connected to the first base end such that the cover and base are integrated as a single piece. The cover is movable between an open position and a closed position such that the lip is positioned adjacent to the second leg and the arm abuts the first leg in the closed position.

18 Claims, 5 Drawing Sheets

(56) References Cited

U.S. PATENT DOCUMENTS

| | | | |
|---|---|---|---|
| 6,125,910 | A | 10/2000 | Pepperell et al. |
| 6,463,983 | B1 | 10/2002 | Lang |
| 6,945,305 | B1 | 9/2005 | Limauro |
| 7,302,986 | B2 | 12/2007 | Flack, II et al. |
| 7,730,932 | B1 | 6/2010 | Bauer et al. |
| 7,735,540 | B2 | 6/2010 | Armstrong |
| 8,074,411 | B1 * | 12/2011 | Anderson ............. E04F 13/005 52/273 |
| 8,156,994 | B2 | 4/2012 | Armstrong |
| 9,617,784 | B2 | 4/2017 | Houlihan |
| 9,752,373 | B2 | 9/2017 | Pardue et al. |
| 10,612,294 | B2 | 4/2020 | Brown et al. |
| 2005/0006038 | A1 * | 1/2005 | Armstrong ................ E06B 9/52 160/371 |
| 2005/0230066 | A1 * | 10/2005 | Morris .................... E04B 9/303 160/327 |
| 2006/0070707 | A1 * | 4/2006 | Armstrong ................ E06B 9/52 160/371 |
| 2007/0256800 | A1 * | 11/2007 | Armstrong ................ E06B 9/52 160/371 |
| 2007/0265800 | A1 | 11/2007 | Sugai |
| 2008/0134553 | A1 * | 6/2008 | Zewald ................... G09F 21/04 40/590 |
| 2009/0159222 | A1 | 6/2009 | Moriya et al. |
| 2010/0147471 | A1 * | 6/2010 | Bull .......................... E06B 9/52 160/381 |
| 2010/0206364 | A1 * | 8/2010 | Armstrong ................ E06B 9/52 160/371 |
| 2012/0297587 | A1 * | 11/2012 | Burton ...................... E06B 9/52 24/594.1 |
| 2014/0027074 | A1 | 1/2014 | Houlihan |
| 2014/0130993 | A1 | 5/2014 | Zwar |
| 2015/0284994 | A1 | 10/2015 | Richter et al. |
| 2018/0094421 | A1 | 4/2018 | Mitchell |
| 2024/0203301 | A1 * | 6/2024 | Povilaitis .................. G09F 1/12 |

OTHER PUBLICATIONS

International Preliminary Report on Patentability regarding International Patent Application No. PCT/US2023/028812, dated Jan. 28, 2025.

* cited by examiner

ONE-PIECE SCREENING SYSTEM

FIELD

The present disclosure relates to a one-piece screening system and attachment device.

BACKGROUND

This section provides background information related to the present disclosure which is not necessarily prior art.

A screen attachment assembly is used to enclose an opening with a screen. Often, screen attachment assemblies include a plurality of components that must be assembled in a particular order and configuration. For example, the screen attachment assembly may include a cover, a base, and a spline as separate components and require tools to insert the spline into the base. However, handling the plurality of components of the screen attachment assembly and the use of tools results in a labor intensive and cumbersome process for an installer.

The present disclosure provides a one-piece screen attachment device that minimizes the number of components and tools required to enclose the opening with the screen. Accordingly, the present disclosure allows for an efficient and streamlined process for the installer.

SUMMARY

This section provides a general summary of the disclosure, and is not a comprehensive disclosure of its full scope or all of its features.

The present disclosure provides a screen attachment assembly that includes a cover, a base, and a spline. The cover extends between a first cover end and a second cover end. The cover includes a cover body, a lip extending from the cover body at the second cover end, and an arm extending from the cover body and positioned between the first cover end and the lip. The base extends between a first base end and a second base end. The base includes a base body, and a first leg and a second leg extending from the base body in the same direction. The spline is disposed between the first and second legs. The first cover end of the cover is pivotally connected to the first base end of the base such that the cover and base are integrated as a single piece. The cover is movable between an open position and a closed position such that the lip is positioned adjacent to the second leg and the arm abuts the first leg when the cover is in the closed position.

In some configurations, the arm includes a flange disposed at a distal arm end of the arm.

In some configurations, the first and second legs each include a protrusion disposed at a distal leg end of the first and second legs.

In some configurations, the flange of the arm abuts the protrusion of the first leg when the cover is in the closed position such that the cover and the base are secured in a snap-fit arrangement.

In some configurations, the screen attachment assembly further includes a screen positioned below the lip, between the second leg and the cover, between the spline and the second leg, between the spline and the base body, and between the first leg and the spline when the cover is in the closed position.

In some configurations, the cover has a range of motion of at least 90 degrees.

In some configurations, the cover and the base are connected using a living hinge.

In some configurations, the cover and the base are connected using a flexible hinge.

In another form, the present disclosure provides a screen attachment assembly that includes a cover, a base, and an integrated spline. The cover extends between a first cover end and a second cover end. The cover includes a cover body and a lip extending from the cover body at the second cover end. The base extends between a first base end and a second base end. The base includes a base body and a first leg, a second leg and a third leg extending from the base body. The first, second, and third legs are spaced apart such that the third leg is disposed at the second base end and the second leg is positioned between the first and third legs. The integrated spline extends between a first spline end and a second spline end. The first cover end of the cover is pivotally connected to the first base end of the base and the first spline end of the integrated spline is pivotally connected to the third leg. The cover is movable relative to the base between an open cover position and a closed cover position such that the lip is positioned adjacent to the third leg when the cover is in the closed cover position. The integrated spline is movable relative to the base between an open spline position and a closed spline position such that the integrated spline is positioned below the cover when the integrated spline is in the closed spline position. The cover, base, and integrated spline are integrated as a single piece.

In some configurations, the integrated spline includes a spline body and a circular formation extending from the spline body.

In some configurations, the circular formation is positioned adjacent to the second leg when the integrated spline is in the closed spline position.

In some configurations, the third leg includes a first protrusion that is positioned adjacent to the lip when the cover is in the closed cover position.

In some configurations, the screen attachment assembly further includes a screen positioned between the lip and the first protrusion of the third leg when the cover is in the closed cover position.

In some configurations, the third leg includes a second protrusion.

In some configurations, the first and second protrusions are positioned on opposite sides of the third leg.

In some configurations, the integrated spline includes a third protrusion disposed at the second spline end such that the second and third protrusions are positioned adjacent to each other when the integrated spline is in the closed spline position.

In some configurations, the screen attachment assembly further includes a screen positioned between the second protrusion of the third leg and the third protrusion of the integrated spline and between the circular formation of the integrated spline and the second leg when the integrated spline is in the closed spline position.

In some configurations, the third protrusion and the circular formation are positioned on opposite sides of the spline body.

In some configurations, the cover and the base are connected using a flexible hinge or a living hinge.

In some configurations, the third leg and the integrated spline are connected using a flexible hinge or a living hinge.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
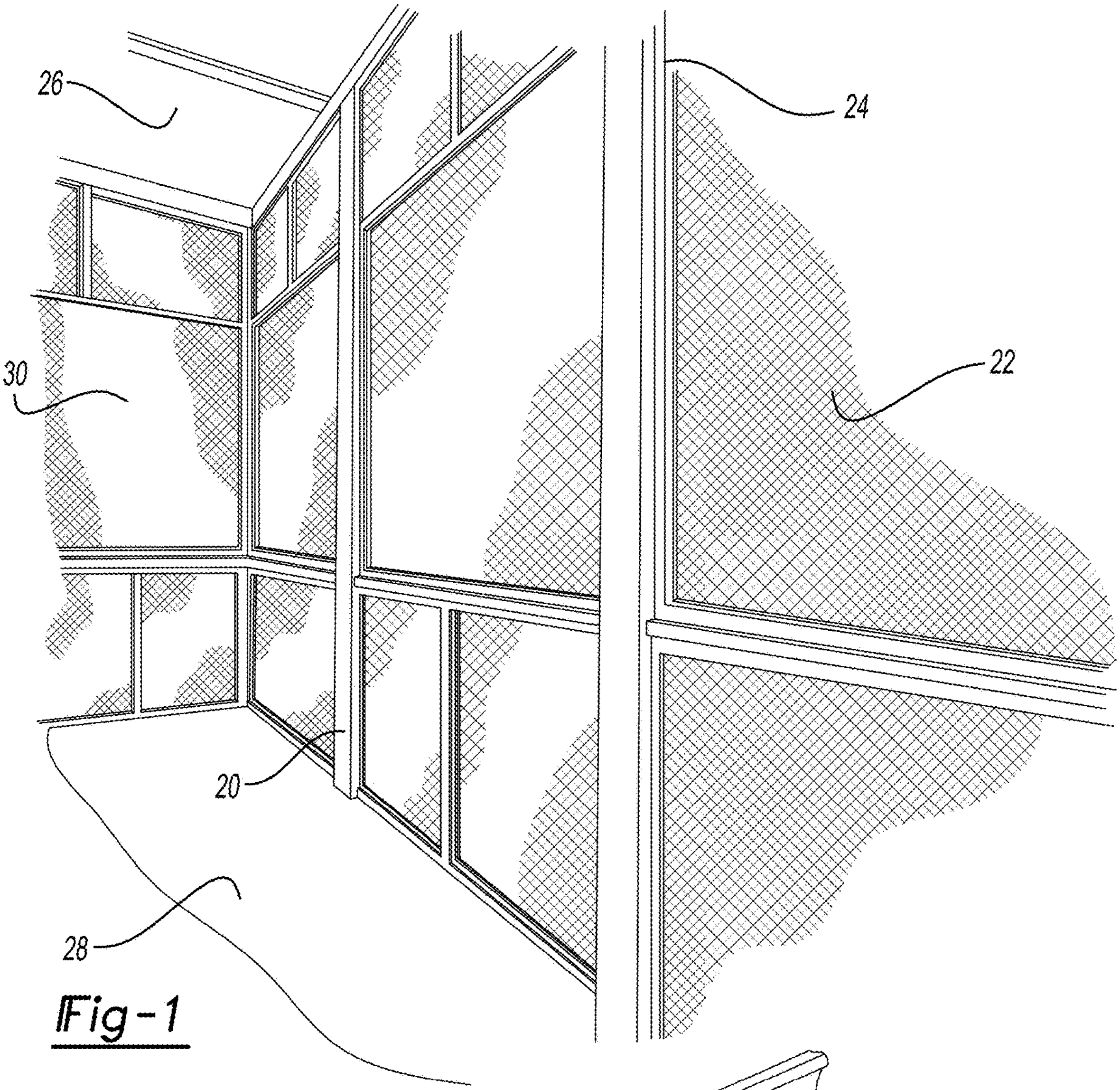
FIG. 1 is a perspective view of a portion of a porch enclosed with a plurality of screen attachment devices according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms “a,” “an,” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being “on,” “engaged to,” “connected to,” or “coupled to” another element or layer, it may be directly on, engaged, connected or coupled to the other element or layer, or intervening elements or layers may be present. In contrast, when an element is referred to as being “directly on,” “directly engaged to,” “directly connected to,” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

With reference to FIG. 1, one or more screen attachment assemblies 20 may be provided to secure one or more screens 22 to an opening 24. In some example embodiments and as shown in FIG. 1, one or more screen attachment assemblies 20 may secure the screen 22 to an opening 24 between a ceiling 26 and a floor 28 to define a screened wall 30. In other example embodiments, one or more screen attachment assemblies 20 may secure the screen 22 to an opening within a wall to define a screened window (not shown). In yet another example embodiment, one or more screen attachment assemblies 20 may secure the screen 22 to an opening in a door to define a screened door (not shown).

Referring to FIGS. 2-5, each screen attachment assembly 20 may include a screen attachment device 32, a spline 34, and the screen 22. The screen attachment device 32 may include a cover 36 and a base 38. The cover 36 and base 38 may extend for a length L of the screen attachment device 32. The cover 36 may be movable between an open position (FIGS. 2-3) and a closed position (FIGS. 4-5) such that the screen 22 may be fixedly attached to the screen attachment device 32 when the cover 36 is in the closed position. Accordingly, the cover 36 may have a range of motion. The range of motion may be greater than 90 degrees.

The cover 36 may include a first cover end 40 and a second cover end 42 that opposes the first cover end 40, and a first cover surface 44 and a second cover surface 46 that opposes the first cover surface 44. Additionally, the cover 36 may include a cover body 48, a lip 50 and one or more arms 52. The cover body 48 may extend between the first cover end 40 and the second cover end 42. The cover 36 may be pivotally connected to the base 38 at the first cover end 40. The lip 50 may protrude from the cover body 48 at the second cover end 42. The one or more arms 52 may protrude from the cover body 48, extend from the second cover surface 46, and be positioned between the first cover end 40 and the lip 50. The arm 52 may be positioned at any angle relative to the cover body 48. More specifically, the arm 52 may include a proximal arm end 54 attached to the cover body 48 and a distal arm end 56 opposing the proximal arm end 54. A flange 58 may be disposed at the distal arm end 56 and may be positioned at any angle relative to the arm 52.

Figure 3:
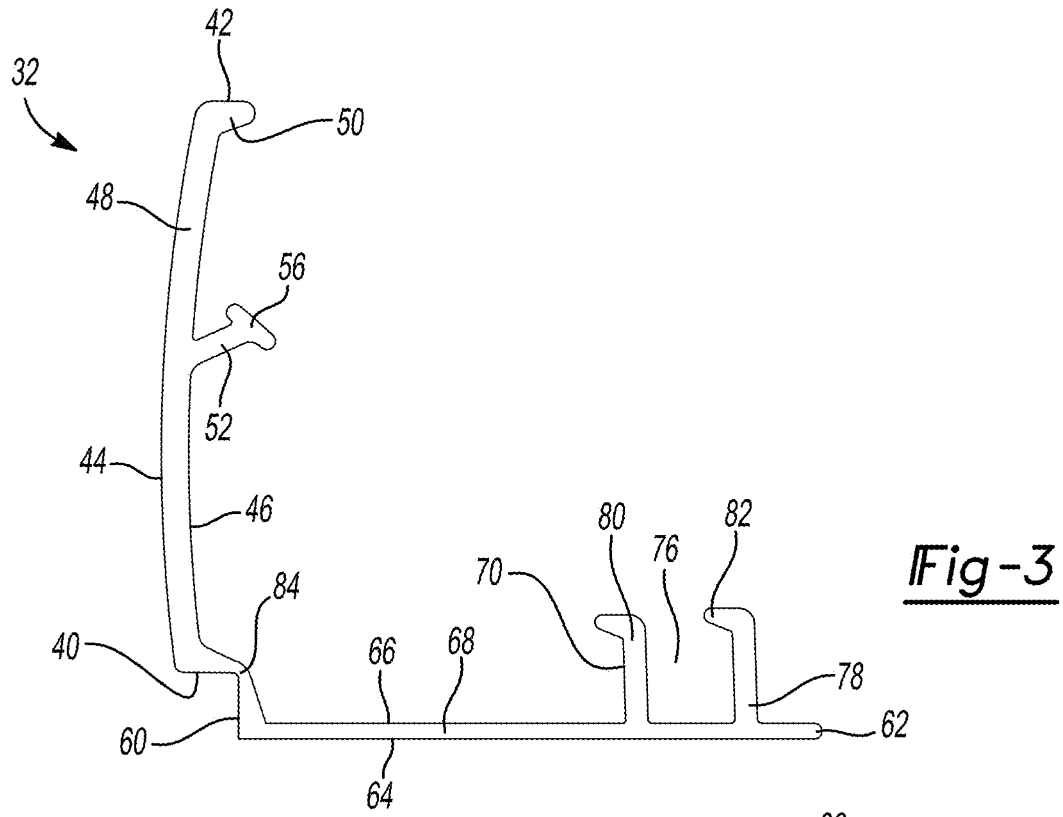
FIG. 3 is a side view of the screen attachment device shown in FIG. 2, where a cover is in an open position.
Figure 4:
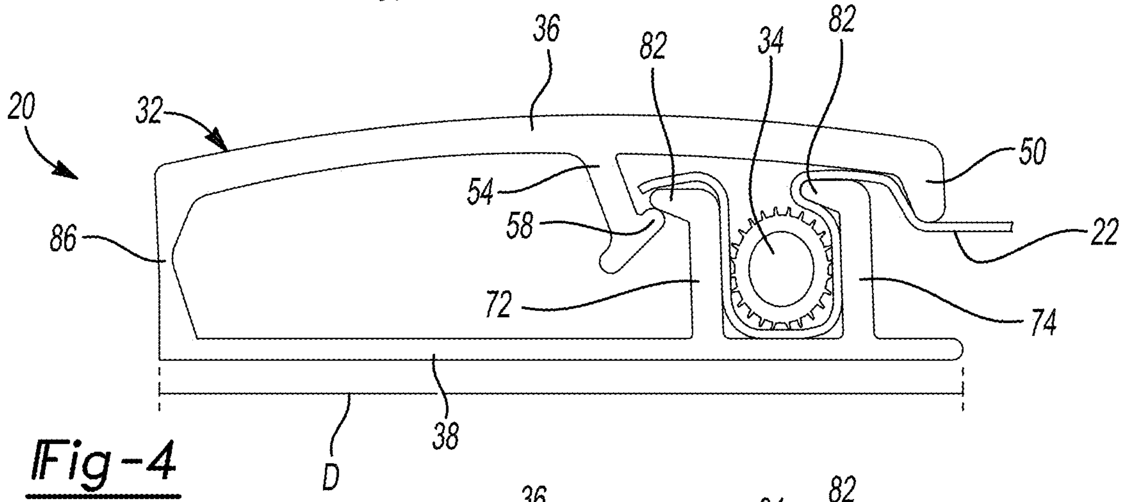
FIG. 4 is a side view of the screen attachment device shown in FIG. 2, where the cover is in a closed position.
Figure 5:
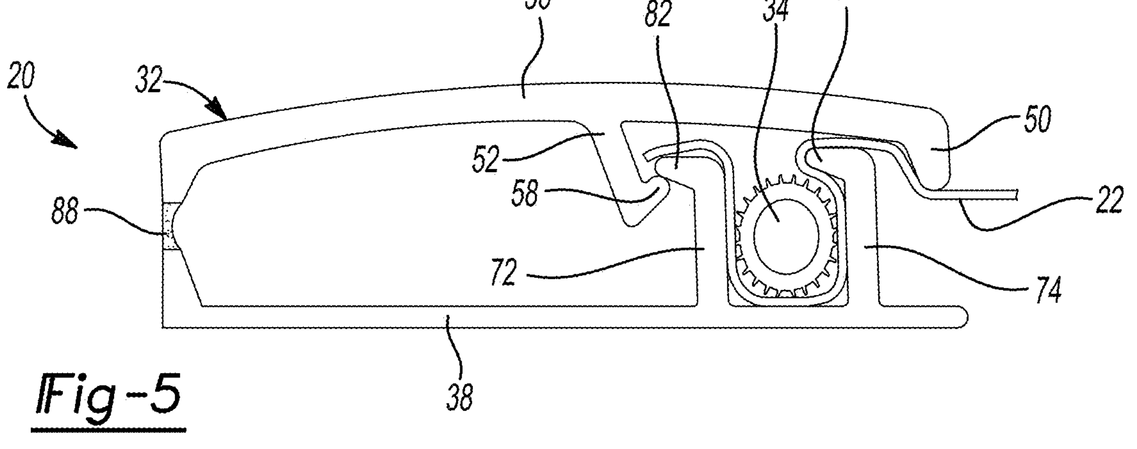
FIG. 5 is a side view of the screen attachment device shown in FIG. 4, where the cover is coupled to a base using a flexible hinge.
Figure 6:
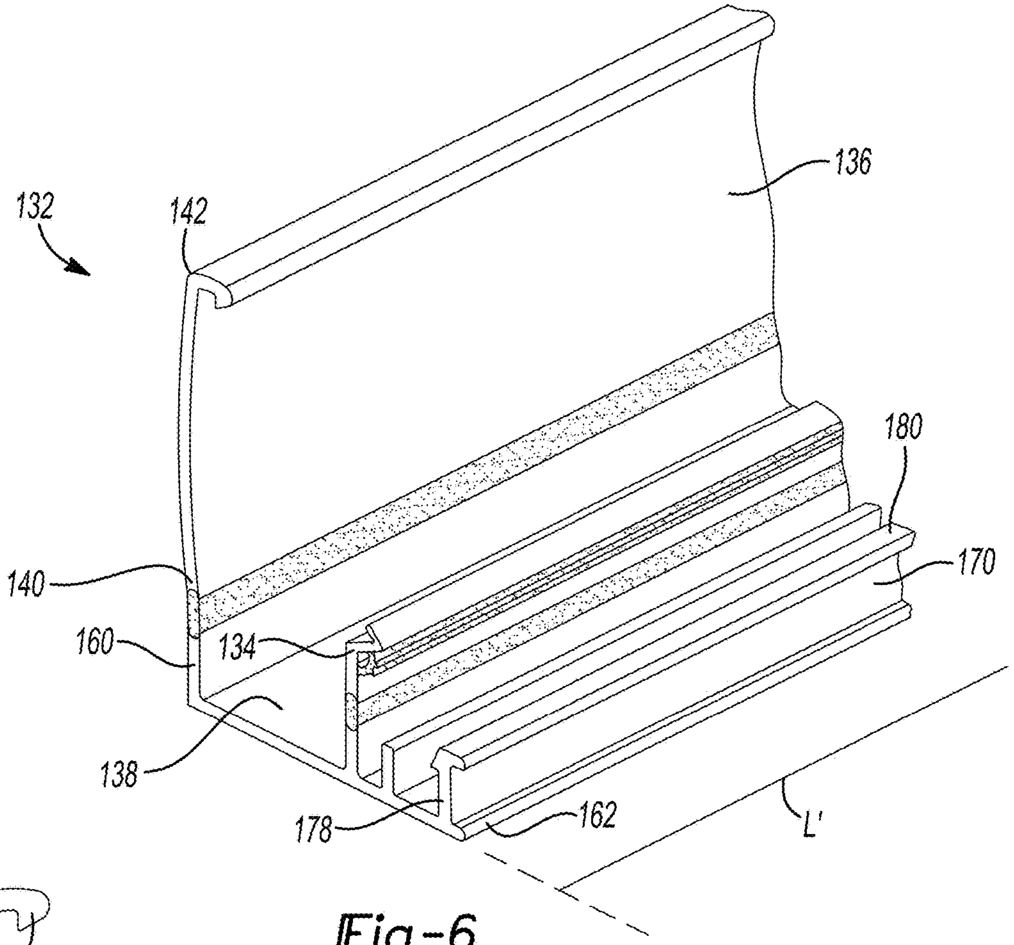
FIG. 6 is a partial perspective view of another screen attachment device according to the principles of the present disclosure.
Figure 7:
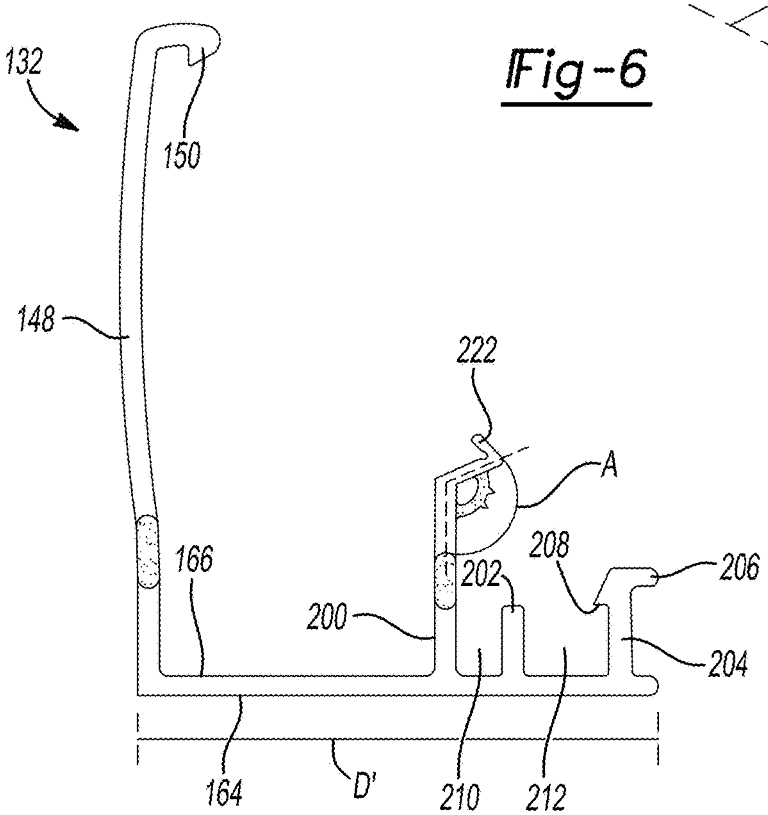
FIG. 7 is a side view of the screen attachment device shown in FIG. 8, where an integrated spline is in an open spline position and a cover is in an open cover position.
Figure 8:
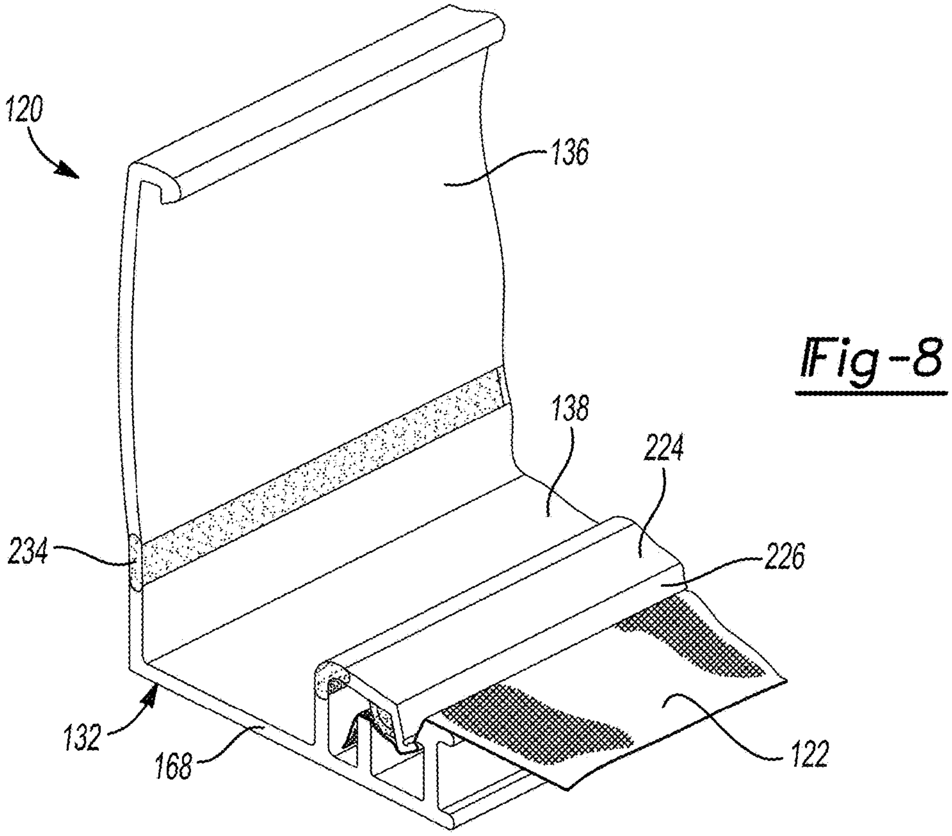
FIG. 8 is a perspective of view of the screen attachment device shown in FIG. 6, where the integrated spline is in a closed spline position and the cover is in the open cover position.

The base 38 may include a first base end 60 and a second base end 62 that opposes the first base end 60, and a first base surface 64 and a second base surface 66 that opposes the first base surface 64. Additionally, the base 38 may include a base body 68 and one or more legs 70. The base body 68 may extend between the first base end 60 and the second base end 62. In some examples, the base body 68 may extend for a dimension D. For example, the dimension D may be approximately 1.5 inches, although any other suitable dimension can be used. The first base end 60 may be pivotally connected to the first cover end 40. The one or more legs 70 may protrude from the base body 68, extend from the second base surface 66, and be positioned between the first base end 60 and the second base end 62. In the example embodiments shown in FIGS. 2-5, the one or more legs 70 may include a first leg 72 and a second leg 74. The second leg 74 may be positioned adjacent to the second base end 62 and the first leg 72 may be spaced apart from the second leg 74. The first and second legs 72, 74 may extend in the same direction to define a cavity 76. The spline 34 may be positioned within the cavity 76 to secure the screen 22 within the cavity 76, as shown in FIGS. 4 and 5. Additionally, the one or more legs 70 may include a proximal leg end 78 attached to the base body 68 and a distal leg end 80 opposing the proximal leg end 78. A protrusion 82 may be disposed at the distal leg end 80 of each of the one or more legs 70 and be positioned at any angle relative to the leg 70. For example, the protrusion 82 may be positioned at an angle of ninety degrees relative to the leg 70.

The cover 36 and the base 38 may be pivotally connected using a hinge 84 such that the cover 36 and base 38 are integrated as a single piece. The hinge 84 may be capable of withstanding temperatures of at least 120° F. and capable of allowing the cover 36 to move between the open position and the closed position for a number of repetitions, such as, for example, at least ten repetitions. In addition, the hinge 84 may be ultra-violet and salt resistant. In some embodiments and as shown in FIG. 4, the hinge 84 may include a living hinge 86. The living hinge 86 may be composed of a plastic material including polyvinyl chloride (PVC) and polypropylene. In other embodiments and as shown in FIG. 5, the hinge 84 may include a flexible hinge 88. The flexible hinge 88 may be composed of a flexible material including flexible polyvinyl chloride (PVC) and santoprene. Alternatively, other hinge mechanisms, such as a butt hinge, ball bearing hinge, barrel hinge, etc., can be used to pivotally attach the cover 36 to the base 38.

The operation of the screen attachment assembly 20 will now be discussed. While the cover 36 is in the open position (FIGS. 2-3), the screen 22 may be positioned along base 38 of the screen attachment device 32. More specifically, the screen 22 may be positioned above the first and second legs 72, 74. The spline 34 may be inserted into the cavity 76 between the first and second legs 72, 74 using a tool. Thereby, the screen 22 may be inserted into the cavity 76. In other words, the screen 22 may be positioned between the first leg 72 and the spline 34, between the spline 34 and the base body 68, and between the second leg 74 and the spline 34. The screen attachment device 32 may be attached to another component (i.e., a wooden stud, a window frame, a door, etc.) using one or more mechanical fasteners (not shown) that is inserted from the second base surface 66 and that extends through the base body 68. The mechanical fasteners may be positioned between the first leg 72 and the first base end 60.

The cover 36 may be moved from the open position to the closed position using a single hand. While the cover 36 is in the closed position (FIGS. 4-5), the arm 52 of the cover 36 may be in contact with the first leg 72 of the base in a snap-fit arrangement to secure the screen 22 to the screen attachment device 32. More specifically, the flange 58 of the arm 52 may contact the protrusion of the first leg 72. Additionally, the lip 50 may be positioned adjacent to the second leg 74.

Figure 9:
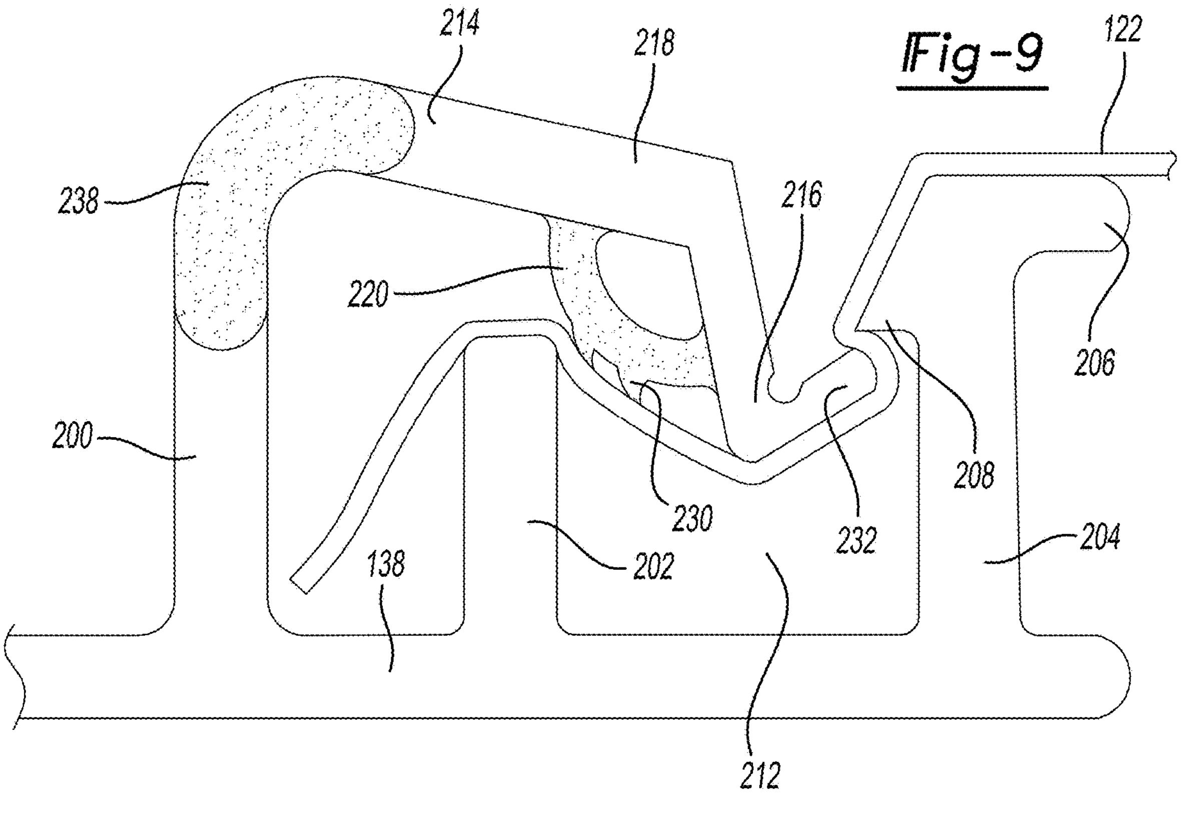
FIG. 9 is a partial side view of the screen attachment device shown in FIG. 6, where the integrated spline is in the closed spline position.
Figure 10:
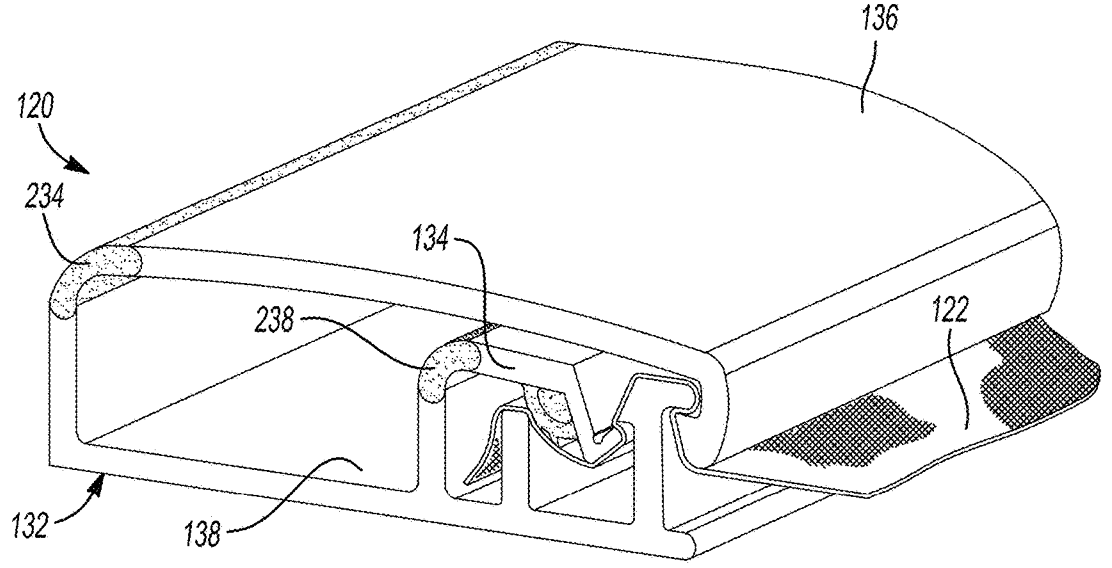
FIG. 10 is a perspective of view of the screen attachment device shown in FIG. 6, where the integrated spline is in the closed spline position and the cover is in a closed cover position.
Figure 11:
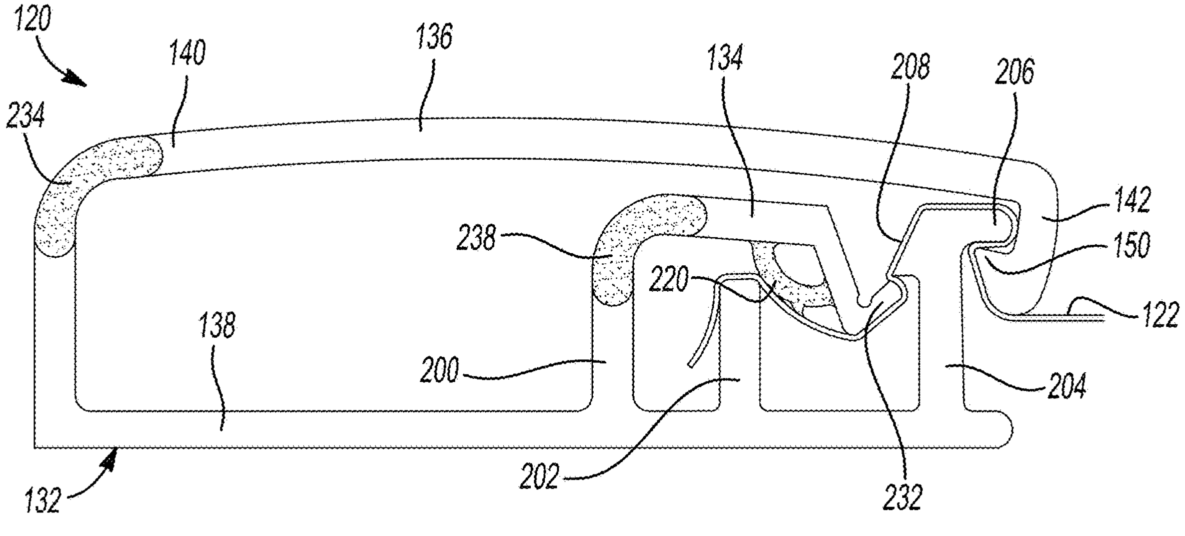
FIG. 11 is a side view of the screen attachment device shown in FIG. 10.

With reference to FIGS. 6-11, another screen attachment assembly 120 is shown. The screen attachment assembly 120 includes a screen 122 and a screen attachment device 132. The screen attachment device 132 may include an integrated spline 134, a cover 136, and a base 138. The integrated spline 134, cover 136, and base 138 may extend for a length L' of the screen attachment device 132. The cover 136 may be movable between an open cover position (FIGS. 6-8) and a closed cover position (FIGS. 10-11). More specifically, the cover 136 may be movable for a first range of motion. The first range of motion may be greater than 90 degrees. Additionally, the integrated spline 134 may be movable between an open spline position (FIGS. 6-7) and a closed spline position (FIGS. 8-11) such that the screen 122 may be fixedly attached to the screen attachment device 132 when the integrated spline 134 is in the closed spline position. More specifically, the integrated spline 134 may be movable for a second range of motion. The second range of motion may be greater than 90 degrees.

The cover 136 may include a first cover end 140 and a second cover end 142 that opposes the first cover end 140. The cover 136 may be pivotally connected to the base 138 at the first cover end 140. Additionally, the cover 136 may include a cover body 148 and a lip 150. The cover body 148 may extend between the first cover end 140 and the second cover end 142. The lip 150 may protrude from the cover body 148 at the second cover end 142.

The base 138 may include a first base end 160 and a second base end 162 that opposes the first base end 160, and a first base surface 164 and a second base surface 166 that opposes the first base surface 164. The first base end 160 may be pivotally connected to the first cover end 140. Additionally, the base 138 may include a base body 168 and one or more legs 170. The base body 168 may extend between the first base end 160 and the second base end 162.

In some examples, the base body 168 may extend for a dimension D' and the dimension D' may be approximately 1.5 inches, although any other suitable dimension can be used. The one or more legs 170 may protrude from the base body 168, extend from the second base surface 166, and be positioned between the first base end 160 and the second base end 162. Additionally, each of the legs 170 may include a proximal leg end 178 attached to the base body 168 and a distal leg end 180 opposing the proximal leg end 178.

In the example embodiment shown in FIGS. 6-11, the one or more legs 170 may include a first leg 200, a second leg 202, and a third leg 204. The second leg 202 may be positioned between the first and third legs 200, 204 such that the third leg 204 may be positioned adjacent to the second base end 162. The third leg 204 may include a first protrusion 206 and a second protrusion 208 disposed at the distal leg end 180. The first and second protrusions 206, 208 may extend from opposite sides of the third leg 204. The first, second, and third legs 200, 202, 204 may extend in the same direction to define a first cavity 210 between the first and second legs 200, 202 and a second cavity 212 between the second and third legs 202, 204.

The integrated spline 134 may include a first spline end 214 and a second spline end 216. The first spline end 214 may be pivotally connected to first leg 200 as shown in FIG. 9. The integrated spline 134 may include a spline body 218, a circular formation 220, and one or more protrusions 222. The spline body 218 may extend between the first spline end 214 and the second spline end 216 and may include a first portion 224 and a second portion 226. The first portion 224 may be positioned at an angle A relative to the second portion 226. The circular formation 220 may extend from the spline body 218 and may include teeth 230. More specifically, the circular formation 220 may extend between the first portion 224 and the second portion 226 of the spline body 218. The circular formation 220 may be composed of a flexible material. The one or more protrusions 222 may include a third protrusion 232 extending from the second spline end 216. More specifically, the third protrusion 232 and the circular formation 220 may extend from opposite sides of the spline body 218.

Figure 2:
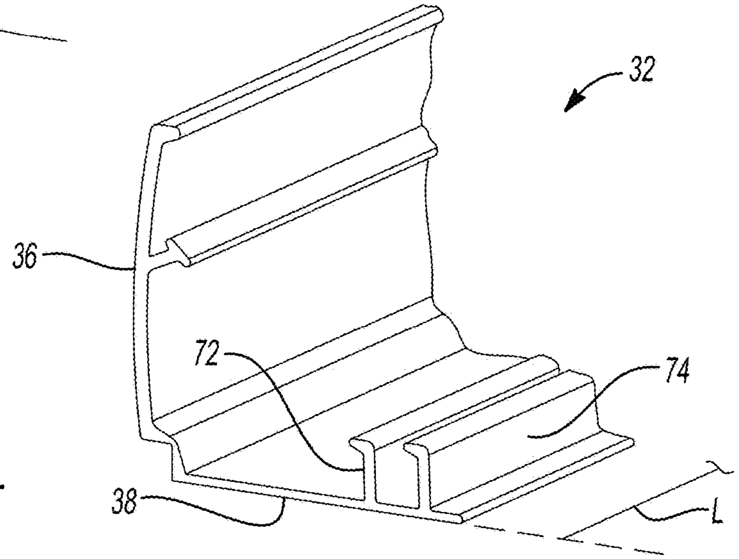
FIG. 2 is a partial perspective view of the screen attachment device of FIG. 1.

The cover 136 and the base 138 may be pivotally connected using a first hinge 234 such that the cover 136 and base 138 are integrated as a single piece. In some embodiments and as shown in FIGS. 6-7, 10-11, the first hinge 234 may include a flexible hinge. In other embodiments, the first hinge 234 may include a living hinge (as shown in FIGS. 2-4). Alternatively, other hinge mechanisms, such as a butt hinge, ball bearing hinge, barrel hinge, etc., can be used to pivotally attach the cover 136 to the base 138. Additionally, the base 138 and the integrated spline 134 may be pivotally connected using a second hinge 238 such that the integrated spline 134, the base 138, and cover 136 are a single piece. In some embodiments and as shown in FIGS. 6-11, the second hinge 238 may include a flexible hinge. In other embodiments, the second hinge 238 may include a living hinge (as shown in FIGS. 2-4 connecting the cover 36 and base 38). Alternatively, other hinge mechanisms, such as a butt hinge, ball bearing hinge, barrel hinge, etc., can be used to pivotally connect the integrated spline 134 to the base 138.

The first and second hinges 234, 238 may be capable of withstanding a temperature of at least 120° F. and capable of allowing the cover 136 to move between the open position and the closed position for a number of repetitions, such as, for example, at least ten repetitions. The first and second hinges 234, 238 may also be ultra-violet and salt resistant. Additionally, the flexible hinge of the first and second hinges 234, 238 may be composed of a flexible material including flexible polyvinyl chloride (PVC) and santoprene. The living hinge of the first and second hinges 234, 238 may be composed of a plastic material including polyvinyl chloride (PVC) and polypropylene.

The operation of the screen attachment assembly 120 will now be described. While the cover 136 is in the open cover position and the integrated spline 134 is in the open spline position (FIGS. 6-7), the screen 122 may be positioned along base 138 of the screen attachment device 132. More specifically, the screen 122 may be positioned above the second and third legs 202, 204. The integrated spline 134 may be moved from the open spline position (FIGS. 6-7) to the closed spline position (FIGS. 8-9) using a single hand. Accordingly, the screen 122 may be inserted into the second cavity 212. In other words, the screen 122 may be positioned between the second leg 202 and the teeth 230 of the circular formation 220, and between the third protrusion 232 of the integrated spline 134 and the second protrusion 208 of the third leg 204. Additionally, the second protrusion 208 of the third leg 204 may be positioned adjacent to the third protrusion 232 of the integrated spline 134 in a snap-fit arrangement. Accordingly, the screen 122 may be secured to the screen attachment device 132 between the integrated spline 134 and the third leg 204 of the base 138. The screen attachment device 132 may be attached to another component (i.e., a wooden stud, a window frame, a door, etc.) using one or more mechanical fasteners (not shown) that is inserted from the second base surface 166 and that extends through the base body 168. The mechanical fasteners may be positioned between the first leg 200 and the first base end 160.

The cover 136 may be moved from the open cover position (FIG. 8) to the closed cover position (FIGS. 10-11) using a single hand. While the cover 136 is in the closed position, the lip 150 may be positioned adjacent to the third leg 204 in a snap-fit arrangement to further secure the screen 122 to the screen attachment device 132. Further securing the screen 122 allows the screen 122 to be tightly secured to the screen 122 attachment device for an aesthetic appeal.

In some embodiments, a screen attachment assembly (not shown) may be provided to secure at least two screens to a screen attachment device. For example, the screen attachment assembly may be identical to the screen attachment assembly 120 with the exceptions described below. The screen attachment device may include a base with a first, second, and third leg and an integrated spline, and a cover. Additionally, the screen attachment device may include a fourth, fifth, and sixth leg extending from the base and positioned adjacent to a first base end. The fourth, fifth, and sixth legs may mirror the first, second, and third legs, respectively. A second integrated spline may extend from the fourth leg and mirror the integrated spline extending from the first leg. Additionally, the cover may be a separate component from the base. The cover may include another lip positioned at a first cover end in addition to a lip positioned at a second cover end. The cover may be secured to the base in a snap fit arrangement such that the third leg and sixth leg of the base are secured to the lips of the cover. Accordingly, one screen may be coupled to the second and third legs and attached using the integrated spline. A second screen may be coupled to the fifth and sixth legs and attached to the screen attachment device using the second integrated spline.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A screen attachment assembly comprising:

a base extending between a first base end and a second base end, the base including a base body and a first leg, a second leg and a third leg extending from the base body, wherein the first, second, and third legs are spaced apart such that the third leg is disposed at the second base end and the second leg is positioned between the first and third legs;

a cover pivotally connected to the first base end of the base body through a first hinge, the cover extending between a first cover end and a second cover end, the cover including a cover body and a lip extending from the cover body at the second cover end; and an integrated spline extending between a first spline end and a second spline end having a spline protrusion, the integrated spline including a spline body pivotally connected to the first leg through a second hinge, the spline body including a circular formation that projects outwardly towards the base, the circular formation being formed from a material different than a material forming the integrated spline;

wherein:

the cover is movable relative to the base between an open cover position and a closed cover position such that the lip engages a first third leg protrusion on a first side of the third leg when the cover is in the closed cover position, and the integrated spline is movable relative to the base separately from the cover between an open spline position and a closed spline position such that the integrated spline is positioned below the cover when the integrated spline is in the closed spline position, when in the closed spline position the spline protrusion engages with a second third leg protrusion on a second side of the third leg opposite the first side of the third leg, and the cover, base, and integrated spline are integrated as a single piece.

2. The screen attachment assembly of claim 1, wherein the circular formation is positioned adjacent to the second leg when the integrated spline is in the closed spline position.

3. The screen attachment assembly of claim 2, wherein the third leg includes a first protrusion that is positioned adjacent to the lip when the cover is in the closed cover position.

4. The screen attachment assembly of claim 3, further comprising a screen positioned between the lip and the first protrusion of the third leg when the cover is in the closed cover position.

5. The screen attachment assembly of claim 3, wherein the third leg includes a second protrusion.

6. The screen attachment assembly of claim 5, wherein the first and second protrusions are positioned on opposite sides of the third leg.

7. The screen attachment assembly of claim 5, wherein the integrated spline includes a third protrusion disposed at the second spline end such that the second and third protrusions are positioned adjacent to each other when the integrated spline is in the closed spline position.

8. The screen attachment assembly of claim 7, further comprising a screen positioned between the second protrusion of the third leg and the third protrusion of the integrated spline and between the circular formation of the integrated spline and the second leg when the integrated spline is in the closed spline position.

9. The screen attachment assembly of claim 7, wherein the third protrusion and the circular formation are positioned on opposite sides of the spline body.

10. The screen attachment assembly of claim 1, wherein the first hinge and the second hinge are integrally formed with the base.

11. The screen attachment assembly according to claim 1, wherein the base is formed from a first material, and the first hinge and the second hinge are formed from a second material that is distinct from the first material.

12. The screen attachment assembly of claim 11, wherein the first hinge and the second hinge are integrally formed with the base.

13. The screen attachment assembly according to claim 1, wherein the first hinge and the second hinge are formed from a flexible material.

14. The screen attachment assembly according to claim 13, wherein the flexible material includes one of flexible polyvinyl chloride (PVC), santoprene, and polypropylene.

15. The screen attachment assembly according to claim 1, wherein the circular formation includes a plurality of teeth.

16. The screen attachment assembly according to claim 1 further comprising a screen disposed between the base and the integrated spline, the circular formation clamping the screen against the second leg when the integrated spline is in the closed spline position.

17. The screen attachment assembly according to claim 1, wherein the integrated spline includes a V-shaped notch defined between the second spline end and the spline protrusion.

18. The screen attachment assembly according to claim 17, wherein the V-shaped notch includes an apex having a rounded profile.

* * * * *